(12) United States Patent
Willis et al.

(10) Patent No.: US 11,629,215 B2
(45) Date of Patent: Apr. 18, 2023

(54) SULFONATED BLOCK COPOLYMERS AND USES THEREOF

(71) Applicant: KRATON POLYMERS LLC, Houston, TX (US)

(72) Inventors: Carl L Willis, Houston, TX (US); Marc D Hein, Houston, TX (US); Richard I Blackwell, Houston, TX (US)

(73) Assignee: KRATON CORPORATION, Houston, TX (US)

( * ) Notice: Subject to any disclaimer, the term of this patent is extended or adjusted under 35 U.S.C. 154(b) by 664 days.

(21) Appl. No.: 16/833,789

(22) Filed: Mar. 30, 2020

(65) Prior Publication Data

US 2020/0317848 A1    Oct. 8, 2020

Related U.S. Application Data

(60) Provisional application No. 62/828,272, filed on Apr. 2, 2019.

(51) Int. Cl.
*C08F 297/04* (2006.01)
*H01B 3/30* (2006.01)

(52) U.S. Cl.
CPC ......... *C08F 297/042* (2013.01); *H01B 3/307* (2013.01)

(58) Field of Classification Search
None
See application file for complete search history.

(56) References Cited

U.S. PATENT DOCUMENTS

| | | | |
|---|---|---|---|
| 4,492,785 A * | 1/1985 | Valint, Jr. | C08F 297/02 525/271 |
| 5,239,010 A * | 8/1993 | Balas | C08F 8/36 525/333.5 |
| 7,737,224 B2 * | 6/2010 | Willis | C08F 8/36 526/287 |
| 7,981,970 B2 | 7/2011 | Willis et al. | |
| 2003/0176582 A1 * | 9/2003 | Bening | C08F 297/04 525/242 |

* cited by examiner

*Primary Examiner* — Christopher M Rodd

(57) ABSTRACT

Disclosed herein is a styrenic block copolymer [A1-B1-C1], consisting essentially of polymer blocks A1, B1 and C1. A1 is a poly(para-alkylstyrene) block having a molecular weight from 1,000 to 60,000 g/mol. B1 is a hydrogenated polyisoprene block or a hydrogenated polybutadiene block having a molecular weight from 1,000 to 100,000 g/mol. C1 is a polystyrene block having a molecular weight from 1,000 to 100,000 g/mol; or a polymer block consisting essentially of polymerized styrene units, and hydrogenated butadiene and/or isoprene units, and having a molecular weight from 1,000 to 100,000 g/mol. Prior to hydrogenation, the block B1 has a vinyl content of 5-75 mol %; and the block C1 forms 1-80 wt % of the overall weight of the block copolymer. The selectively sulfonated forms of the copolymers are useful as high dielectric materials.

17 Claims, No Drawings

SULFONATED BLOCK COPOLYMERS AND USES THEREOF

RELATED APPLICATIONS

This application claims priority from U.S. Provisional Application No. 62/828,272, with a filing date of Apr. 2, 2019, the entire disclosure is incorporated herein by reference.

FIELD

The present disclosure relates to sulfonated block copolymers and their uses.

BACKGROUND

Styrenic block copolymers are a widely used class of polymers in industry. They generally consist of polystyrene blocks and rubber blocks, where the rubber blocks are generally made of polybutadiene, polyisoprene, or their hydrogenated equivalents. The tri-block copolymer with polystyrene blocks at both ends linked together by a rubber block is an important polymer structure. Hydrogenated forms of the tri-block copolymers, such as styrene-ethylene/butylene-styrene and styrene-ethylene/propylene-styrene are also well known polymers used in a variety of applications.

In a styrene-butadiene-styrene block copolymer, the polystyrene phase forms nanometer-sized domains in the microstructure. Depending on the polystyrene content, the polystyrene domain can be spherical, cylindrical or lamellar in shape. The polystyrene domain in the block copolymer can be chemically transformed into functionalized polymer blocks that can have physical and chemical properties very different from those of the soft or the rubber block domain. Such polymers can have a very different set of properties that makes them potentially useful in hitherto unknown areas.

There is a continuing need for styrenic block copolymers that can be produced in a facile manner and also be transformed into functionalized block copolymers having diverse morphologies, and physical and chemical properties.

SUMMARY

One aspect of the disclosure is a styrenic block copolymer (abbreviated as SBC), consisting essentially of polymer blocks A1, B1 and C1 and having a formula [A1-B1-C1]. A1 is a poly(para-alkylstyrene) block having a number average molecular weight from 1,000 to 60,000 g/mol. B1 is a hydrogenated polyisoprene block (E/P) or a polybutadiene block (E/B) having a molecular weight from 1,000 to 100,000 g/mol. C1 is a polystyrene block having a molecular weight from 1,000 to 100,000 g/mol; or a polymer block consisting essentially of polymerized styrene units, and hydrogenated butadiene units and/or hydrogenated isoprene units; and has a molecular weight from 1,000 to 100,000 g/mol. Prior to hydrogenation, the block B1 has a vinyl content of 5-75 mol %; and the block C1 from 1-80 wt % of the overall weight of the block copolymer.

Another aspect of the disclosure is a sulfonated styrenic block copolymer (designated as SSBC), consisting essentially of polymer blocks A1, B1 and D1 and having a formula [A1-B1-D1]. A1 is a poly(para-alkyl styrene) block having a number average molecular weight from 1,000 to 60,000 g/mol. B1 is a hydrogenated polyisoprene block (E/P) or a hydrogenated polybutadiene block (E/B) having a molecular weight from 1,000 to 100,000 g/mol. D1 is a sulfonated polystyrene block, or a polymer block consisting essentially of sulfonated styrene units, and hydrogenated butadiene units and/or hydrogenated isoprene units. Prior to hydrogenation, the block B1 has a vinyl content of 5-75 mol %; and forms from 1-80 wt % of the overall weight of the block copolymer. Prior to sulfonation, the block D1 is a polystyrene block having a number average molecular weight from 1,000 to 100,000 g/mol.

In other aspects, the sulfonated block copolymers described above are useful as dielectric materials, which allows their use as insulators and in energy storage devices, such as electrical capacitors.

DESCRIPTION

The following terms used the specification and will have the following meanings:

The notation "E/B" denotes a polymer block made of ethylene and butylene units in a random order, resulting from hydrogenation of the polymerized butadiene units, which are formed when 1,3-butadiene polymerizes by 1,2- and 1,4-addition mechanisms.

The notation "E/P" denotes a polymer block made of ethylene and propylene units in a random order, resulting from hydrogenation of the polymerized isoprene units, which are formed when isoprene polymerizes by 1,2- and 1,4-addition mechanisms.

"Molecular weight" means the molecular weight as measured using gel permeation chromatography using polystyrene standards in accordance with ASTM 5296-11 test method.

"Controlled distribution of styrene", refers to a polymerization resulting in a polymer block that has certain styrene-rich regions and certain conjugated diene-rich regions. "Controlled distribution" refers to a molecular structure having the following attributes: (1) terminal regions adjacent to the mono alkenyl arene (also referred sometimes as "vinylaromatic compound") homopolymer blocks that are rich in (i.e., having a greater than average amount of) conjugated diene units; (2) one or more regions not adjacent to the vinylaromatic polymer blocks that are rich in (i.e., having a greater than average amount of) polymerized vinylaromatic units; and (3) an overall structure having relatively low blockiness. "Rich in" means greater than the average amount, e.g., 5% higher than the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. Blockiness can also be inferred from the UV-visible absorbance in a wavelength range suitable for the detection of polystyryllithium end groups formed during the polymerization of the diene block. A sharp and substantial increase in this value is indicative of a substantial increase in polystyryllithium chain ends, which can occur, for example, when the conjugated diene concentration drops below the critical level to maintain controlled distribution polymerization. Any styrene monomer (S) that is present at this point will add in a blocky fashion.

"Styrene blockiness", as measured by proton NMR, is defined to be the proportion of styrene units in the polymer having two nearest styrene neighbors on the polymer chain.

"Consisting essentially of polymerized styrene units, and hydrogenated butadiene units and/or hydrogenated isoprene units" means the polymer block has less than 10 wt. % of a polymerized vinylaromatic compound other than styrene and/or a polymerizable 1,3-diene other than butadiene and isoprene.

"Loss angle" refers to the phasor in the complex plane whose real and imaginary parts are the resistive or lossy component of an electromagnetic field and its reactive or lossless counterpart, respectively. Loss angle of a material gives a measure of power lost due to the material. The lower the loss angle, less is the power lost.

"Breakdown voltage" is the minimum voltage that causes an insulator material or a portion of the material to become electrically conductive. In other words, it is the maximum voltage difference that can be applied across an insulator material before the material conducts.

"Specific resistance" means the resistance offered to flow of current by a conducting material having unit length. For example, a specific resistance of $10^{16}$ ohm $cm^{-1}$ for a material means a resistance of $10^{16}$ ohm across a distance of 1 cm.

The disclosure provides styrenic block copolymers (SBC) for preparing the corresponding sulfonated analogues, with mechanical properties and dielectric properties suitable for use in energy storage devices and insulators.

Styrenic Block Copolymer (SBC):

The SBC component consists essentially of polymer blocks A1, B1 and C1 and has a formula [A1-B1-C1], where A1, B1 and C1 are as defined previously.

Suitable para-alkylstyrenes for building the A1 block include compounds where the para-alkyl group is a $C_1$-$C_{12}$ linear or branched alkyl group. In embodiments, the para-alkyl styrene is selected from para-methyl styrene, para-ethyl styrene, para-isopropylstyrene, para-tert-butylstyrene, and combinations thereof. The A1 block can have a relatively higher glass transition temperature, example, greater than 20-50° C., as compared to the other polymer blocks in the SBC, which can lead to copolymers having desirable mechanical and other functional properties, including morphology, that makes them suitable for use as dielectric materials. The molecular weight of the block A1 can be from 1,000 to 60,000 g/mol. In embodiments, the A1 block has a molecular weight from 1,000-20,000 g/mol; from 5,000-30,000 g/mol; or from 10,000-25,000 g/mol. In embodiments, the A1 block forms 1-80 wt %, alternatively 1-20 wt %, as a function of the overall weight of the SBC.

The block B1 of the SBC is a hydrogenated polyisoprene block, or a hydrogenated polybutadiene block, which are obtained from the corresponding polyisoprene or polybutadiene, respectively. The polyisoprene and polybutadiene can have varying levels of vinyl group content. The vinyl groups are produced when isoprene or butadiene adds in a 1,2-fashion in the polymerization step. Hydrogenation of the pendant vinyl groups produces saturated alkyl side chains on the polymer backbone. In embodiments, the B1 block can have a vinyl content of 5-75 mol %. The vinyl content can be controlled in the polymerization step by using additives. In embodiments, the B1 block has a molecular weight from 1,000-100,000 g/mol; from 1,000-50,000 g/mol; from 10,000-30,000 g/mol; or from 10,000-20,000 g/mol. The B1 block can form from 4-25 wt. % of the overall block copolymer.

In an embodiment, the block C1 is a polystyrene block. In another embodiment, the C1 block consists essentially of polymerized styrene units, and hydrogenated butadiene and/or hydrogenated isoprene units. Various configurations are possible for the C1 block, which can give rise to block copolymers having a range of polymer architectures and morphologies. Examples of configurations of the C1 block include a sequential [polystyrene-polybutadiene] block, a sequential [polystyrene-polyisoprene] block, a random poly (styrene-butadiene) block, a random poly(styrene-isoprene) block, a random poly(styrene-isoprene-butadiene) block, a controlled distribution poly(styrene-butadiene) block, and a controlled distribution poly(styrene-isoprene) block. In embodiments, the C1 block has a molecular weight from 1,000-100,000 g/mol; from 1,000-20,000 g/mol; or from 10,000-30,000 g/mol. When the C1 block contains polymerized isoprene and/or butadiene units, the vinyl content prior to hydrogenation can be from 5-75 mol %.

There are several embodiments of the SBC based on the above features. Thus, the SBC can have an A1 block selected from a [(poly-p-tert-butyl alkylstyrene) block, a [(poly-p-methylstyrene) block, or combinations thereof; and having a molecular weight from 5,000-30,000 g/mol. The SBC can have a B1 block that is a hydrogenated polyisoprene block (E/P) having a molecular weight from 1,000-50,000 g/mol. The SBC can have a C1 block that is a polystyrene block having a molecular weight from 1,000-20,000 g/mol. Alternatively, the SBC can have a block B1 that is a hydrogenated polybutadiene block (E/B) having a molecular weight from 1000-50000 g/mol. Alternatively, the SBC can have a block C1 which is a hydrogenated form of a polymer block consisting essentially of polymerized styrene and butadiene units and having a molecular weight from 1,000-20,000 g/mol. In other embodiments, the SBCs have a block C1 which forms from 1-10 wt. % of the overall weight of the block copolymer.

In one embodiment, the SBC consists essentially of polymer blocks A1, B1 and C1, where A1 is selected from a [(poly-p-tert-butyl alkylstyrene) block, a [(poly-p-methylstyrene) block, or combinations thereof, and has a molecular weight from 5,000-30,000 g/mol. B1 is a hydrogenated polyisoprene block (E/P) having a molecular weight from 1000-50000 g/mol, and C1 is a polystyrene block having a molecular weight from 1,000-20,000 g/mol. In the blocks B1 and C1 of the SBC, up to 10 mole percent of the aromatic double bonds, and at least 80 mole percent of the diene double bonds can be hydrogenated. Prior to hydrogenation, the block B1 has a vinyl content of 5-75 mol %, and the C1 block forms from 1-10 wt. % of the overall weight of the block copolymer.

In another embodiment, the SBC consists essentially of polymer blocks A1, B1 and C1, where A1 is selected from a [(poly-p-tert-butyl alkylstyrene) block, a [(poly-p-methylstyrene) block, or combinations thereof, and has a molecular weight from 5,000-30,000 g/mol. B1 is a hydrogenated polybutadiene block (EB) having a molecular weight from 1,000-50,000 g/mol. C1 is a hydrogenated form of a polymer block consisting essentially of polymerized styrene and butadiene units and having a molecular weight from 1,000-20,000 g/mol. In the blocks B1 and C1 of the SBC, up to 10 mole percent of the aromatic double bonds, and at least 80 mole percent of the diene double bonds can be hydrogenated. Prior to hydrogenation, the block C1 forms from 1-10 wt % of the overall weight of the block copolymer.

In other embodiments, the SBCs described above can have a structure where the block C1, prior to hydrogenation, has a random distribution of polymerized styrene, and butadiene or isoprene units. In other embodiments, the SBCs described above can have a structure where the block C1, prior to hydrogenation, is a controlled distribution block having polymerized styrene and butadiene units. In still other embodiments, the C1 block, prior to hydrogenation, is a controlled distribution block having polymerized styrene, butadiene, and isoprene units. In the blocks B1 and C1 of the SBC, up to 10 mole percent of the aromatic double bonds, and at least 80 mole percent of the diene double bonds can be hydrogenated.

Preparation of the SBC:

The SBCs can be prepared by anionic polymerization using techniques known in the art. Other methods, such as cationic polymerization, can also be employed. The anionic polymerization initiator is generally an organometallic compound, such as an organolithium compound, e.g., ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. The amount of initiator needed is calculated based on the molecular weight to be achieved, generally from 0.002 to 5 mol percent, based on the amount of monomer to be polymerized. Suitable solvents include aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or suitable mixtures. Polymer chain termination can be achieved by quenching with a proton donor or a compound having a leaving group that can be displaced by the carbanionic polymer chain.

If desired, a Lewis base additive, which affects polymerization parameters can also be employed. Examples of Lewis bases include dimethyl ether, diethyl ether, ethylene glycol dimethyl ether, 1,2-diethoxypropane, diethylene glycol dimethyl ether, tetrahydrofuran, tetrahydrofurfuryl ethers, such as tetrahydrofurfuryl methyl ether, and tertiary amines. The additives can influence the extent of 1,2-addition of the conjugated diene, and therefore the vinyl group content in the SBC. Use of such additives can also help in achieving a controlled distribution of polymerized styrene units in the blocks B1 and/or C1 of the SBC.

Hydrogenation of the vinyl groups present in the SBC can be effected under conditions such that at least 80 mol %, at least 90 mol %, or at least 98 mol % of the vinyl groups are reduced, and 0-10 mol % of the arene double bonds are reduced. A suitable catalyst based on nickel, cobalt or titanium is used in the hydrogenation step.

Sulfonated Styrenic Block Copolymer (SSBC):

The SBCs described above can be sulfonated to provide the corresponding SSBCs. Sulfonation occurs at the phenyl ring of the polymerized styrene units, predominantly para to the phenyl carbon atom bonded to the polymer backbone. The SSBC can be obtained by sulfonating the corresponding SBC. In embodiments, the polymerized styrene units are sulfonated to the extent of 1-100 mol percent; alternatively from 10-100 mol percent, alternatively from 20-90 mol percent, or alternatively from 30-80 mol percent.

Preparation of the Sulfonated SBC (SSBC):

Any of the known sulfonation agents can be used for introducing sulfonic acid groups in the SBCs. Non-limiting examples of sulfonation agents include chlorosulfonic acid in an organic solvent such as diethyl ether, acyl sulfates such as acetyl sulfate, and sulfur trioxide. Acyl sulfates are preferred as the reaction can be conducted conveniently under mild conditions. A solvent such as dichloromethane or dichloroethane can be used. The reaction conditions and stoichiometry can be varied to achieve varying degrees of ring-sulfonation of the polymerized styrene units. In embodiments, the polymerized styrene units in the block C1 of the SBC are sulfonated to the extent of 1-100 mol percent; 10-80 mol percent, or 50-80 mol percent.

Properties of the SSBC:

The morphology of the SSBCs gives them unique properties. The SSBCs of general structure A1-B1-D1, where the A1 block lacks sulfonic acid groups, B1 is a soft block, and D1 is the ionic block containing sulfonic acid groups, exhibit a tendency to form a core-shell type micelle structure having a core of the ionic block D1 surrounded by an outer segment comprising the soft block B1, and the hard block A1. When such a polymer is solution-cast as a film, the film has discreet ion microphases, that affords the material unique performance characteristics. The A1 block can form a continuous, rigid phase which resists the transport of ions and electrons, and will therefore have "insulating" performance characteristics. The D1 block can form a dispersed (discontinuous, preferably spherical) phase in the film and contain polymer bound ions (charged species) whose movement can be essentially constrained within the boundaries of this phase. The B1 soft block can form a compliant phase around the D1 block structure and allow deformation of the D1 block component in the presence of an applied field. In this way, the electric field does work on the film. This work can be recovered when the film is removed from the electric field, thereby reversing the process and discharging the film.

Uses of the SSBC:

The properties described above makes the SSBCs useful in energy storage applications. In an embodiment, the SSBCs can be used to make an electrical capacitor, which in turn can be used for charging devices in a variety of applications. In an applied external electric field, the SSBCs can become polarized, thereby allowing their use as a supercapacitor or an ultracapacitor. The energy storage mechanism of an ultracapacitor is highly reversibe, which allows it to be charged and discharged many times over.

The SSBCs have electrical properties, such as a high dielectric constants, low tangent loss angles, high breakdown voltages, and high bulk resistance, that makes them valuable as an insulator and energy storage applications. In embodiments, the SSBCs described herein have a dielectric constant from $10^2$-$10^8$, alternately $10^4$-$10^8$, or alternately $10^3$-$10^6$. The loss angle of the SSBCs can be from greater than zero to 10, alternately 0.05-0.1, alternately 0.1-0.2, alternately 0.2-1, alternately 1-5, or alternately 5-10. The breakdown voltage of the SSBCs can be 500-1000 volts, alternately 500-800 volts; or alternately 800-1000 volts. The specific resistance of the SSBCs can be from $10^8$ to $10^{18}$ ohm $cm^{-1}$, alternately from $10^8$-$10^{12}$ ohm $cm^{-1}$, or alternately from $10^{14}$-$10^{18}$ ohm $cm^{-1}$.

The above properties enables the use of the SSBCs as high dielectric materials. These materials can be used in energy storage devices for storing electrical charge, thus enabling their use as an electrical capacitor or a supercapacitor. Thus the SSBCs can be useful for producing charging devices for various applications.

EXAMPLES

The following test methods can be used.

Proton NMR methodology is used to determine the polystyrene content (PSC), the content of the poly(para-alkylstyrene), the blockiness index, the controlled distribution of styrene, and the vinyl units content in the non hydrogenated SBC. Glass transition temperature (Tg) of the polymer sample is measured by Dynamic Mechanical Analysis (DMA) according to ASTM 4065. Tensile strength and dry tensile elongation measurements can be carried out on the films according to ASTM D-412.

Polymer samples P2-P7 are prepared using the procedure described above for making P1.

TABLE 1

SBC samples prepared.

| Polymer | A1 block, MW | B1 block, MW | C1 block, MW | Wt % A1 | Wt % B1 | Wt % C1 |
|---|---|---|---|---|---|---|
| P1 | Poly(ptBS), 15 | Poly(E/P), 10 | Poly(S), 1.5 | 56.6 | 37.7 | 5.7 |
| P2 | Poly(ptBS), 13.9 | Poly(E/P), 12 | Poly(S), 6.6 | 42.8 | 36.9 | 20.3 |
| P3 | Poly(ptBS), 18.6 | Poly(E/P), 11.5 | Poly(S), 1.9 | 58.1 | 35.9 | 6.1 |
| P4 | Poly(ptBS), 18.1 | Poly(E/P), 12.3 | Poly(S), 3 | 54.2 | 36.8 | 9.0 |
| P5 | Poly(ptBS), 20.2 | Poly(E/P), 12.4 | Poly(S), 2 | 58.4 | 35.8 | 5.8 |
| P6 | Poly(ptBS), 21.6 | Poly(E/P), 13.2 | Poly(S), 2.2 | 58.4 | 35.7 | 5.9 |
| P7 | Poly(pMeS), 25 | Poly(E/B), 24 | Poly(E/B/S), 26 | 33.3 | 32.0 | 34.7 |

In Table 1, ptBS is para-tert-butylstyrene; Poly(E/P) is poly(ethylene-propylene); pMeS is para-methylstyrene, and in polymer P7, the E/B/S block, prior to hydrogenation, has 50:50 weight percent of polymerized butadiene and styrene, respectively.

The SSBCs Q1-Q7, prepared from the SBCs P1-P7, respectively, are cast as films onto a release linear from solutions prepared using a solvent such as toluene. The film is then dried, and the dry film is laminated onto an aluminum foil under heat and pressure in a Carver Press. Mechanical properties such as tensile strength are measured on the cast film.

For measuring electrical properties, the laminated foil prepared above can be placed between Kapton® adhesive sheets to make the cell. The cell can be tested on an LCR meter to measure the cell's inductance, capacitance and resistance.

TABLE 2

Mechanical Properties of the SSBC membranes.

| Polymer | SSBC Polymer film | Dry Tensile Strength (psi) | Dry Tensile Elongation (%) |
|---|---|---|---|
| P1 | Q1 | 1100 | 25 |
| P2 | Q2 | 1640 | 530 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A styrenic block copolymer consisting essentially of polymer blocks A1, B1 and C1 and having a formula [A1-B1-C1], wherein
   A1 is a poly(para-alkylstyrene) block having a molecular weight from 1,000 to 60,000 g/mol;
   B1 is a hydrogenated polyisoprene block (E/P) or a hydrogenated polybutadiene block (EB) having a molecular weight from 1,000 to 100,000 g/mol; and
   C1 is a polystyrene block having a molecular weight from 1,000 to 100,000 g/mol, or a polymer block consisting essentially of polymerized styrene units, and hydrogenated butadiene and/or isoprene units, and having a molecular weight from 1,000 to 100,000 g/mol;
   wherein prior to hydrogenation,
      the block B1 has a vinyl content of 5-75 mol %, and
      the block C1 forms from 1-80 wt % of the overall weight of the block copolymer.

2. The block copolymer of claim 1, wherein the poly (para-alkylstyrene) block is selected from a poly(para-methylstyrene) block, a poly(para-tert-butylstyrene) block, and combinations thereof.

3. The block copolymer of claim 1, wherein the polymerized styrene units in the block C1 are sulfonated to the extent of 1-100 mol percent.

4. The block copolymer of claim 1, wherein the C1 block forms from 1-10 wt. % of the overall block copolymer.

5. The block copolymer of claim 1, wherein the B1 block forms 4-25 wt. % of the block copolymer.

6. The block copolymer of claim 1, wherein
   A1 is selected from a [(poly-p-tert-butyl alkylstyrene) block, a [(poly-p-methylstyrene) block, or combinations thereof, and having a molecular weight from 5,000-30,000 g/mol;

B1 is a hydrogenated polyisoprene block (E/P) having a molecular weight from 1000-50000 g/mol; and C1 is a polystyrene block having a molecular weight from 1,000-20,000 g/mol.

7. The block copolymer of claim 6, wherein the styrene units in the polymer block C1 are sulfonated to the extent of 1-100 mol percent.

8. The block copolymer of claim 6, wherein the block B1 forms 4-25 wt. % of the block copolymer.

9. The block copolymer of claim 1, wherein

A1 is a [(poly-p-tert-butyl alkylstyrene) block, a [(poly-p-methylstyrene) block, or combinations thereof having a molecular weight from 5,000-30,000 g/mol;

B1 is a hydrogenated polybutadiene block (E/B) having a molecular weight from 1000-50000 g/mol;

the block C1 consists essentially of polymerized styrene and hydrogenated butadiene units and has a molecular weight from 1,000-20,000 g/mol;

and prior to hydrogenation, the block C1 forms from 1-10 wt % of the overall weight of the block copolymer.

10. The block copolymer of claim 9, wherein the block C1 has a controlled distribution of polymerized styrene units.

11. The block copolymer of claim 9, wherein the block C1 has a random distribution of polymerized styrene units.

12. The block copolymer of claim 10, wherein 10-100 mol percent of the polymerized styrene units in the block C1 are sulfonated.

13. A sulfonated styrenic block copolymer consisting essentially of polymer blocks A1, B1 and D1 and having a formula [A1-B1-D1], wherein A1 is a poly(para-alkylstyrene) block having a molecular weight from 1,000 to 60,000 g/mol;

B1 is a hydrogenated polyisoprene block (E/P) or a hydrogenated polybutadiene block (E/B) having a molecular weight from 1,000 to 100,000 g/mol; and D1 is a sulfonated polystyrene block; or a polymer block consisting essentially of sulfonated styrene units, and hydrogenated butadiene units and/or hydrogenated isoprene units;

wherein prior to hydrogenation,
the block B1 has a vinyl content of 5-75 mol %, and
the block D1 forms from 1-80 wt % of the overall weight of the block copolymer;

and wherein prior to sulfonation,
the block D1 is a polystyrene block having a molecular weight from 1,000 to 100,000 g/mol.

14. The sulfonated block copolymer of claim 13, wherein the polymerized styrene units in the block D1 has a degree of sulfonation from 1-100 mole %.

15. The block copolymer of claim 13, having one or more of a dielectric constant from $10^2$-$10^8$, a loss angle from 0.05-0.25, a breakdown voltage from 500-1000 volts, and a specific resistance from $10^8$-$10^{18}$ ohm/cm, measured according to ASTM D150 test method.

16. A dielectric material comprising the block copolymer of claim 13.

17. An insulating material comprising the block copolymer of claim 13.

* * * * *